United States Patent
Fox et al.

(10) Patent No.: US 6,936,191 B2
(45) Date of Patent: Aug. 30, 2005

(54) ELECTRICALLY CONDUCTIVE THERMOPLASTIC POLYMER COMPOSITION

(75) Inventors: Richard T. Fox, Midland, MI (US);
Susan J. Babinec, Midland, MI (US);
Kevin E. Howard, Midland, MI (US);
Mark A. Chartier, Gladwin, MI (US);
Todd M. Clarey, Bay City, MI (US);
Ruseell B. Peters, Jr., Saginaw, MI (US)

(73) Assignee: Doe Global Technologies Inc., Midland, MI (US)

( * ) Notice: Subject to any disclaimer, the term of this patent is extended or adjusted under 35 U.S.C. 154(b) by 378 days.

(21) Appl. No.: 10/247,905

(22) Filed: Sep. 20, 2002

(65) Prior Publication Data

US 2003/0089892 A1 May 15, 2003

Related U.S. Application Data

(60) Provisional application No. 60/333,187, filed on Nov. 13, 2001.

(51) Int. Cl.$^7$ ................................................. H01B 1/22
(52) U.S. Cl. ........................ 252/512; 252/514; 264/104
(58) Field of Search ................................. 252/512, 514; 264/104

(56) References Cited

U.S. PATENT DOCUMENTS

| 4,404,125 A | 9/1983 | Abolins et al. |
| 4,566,990 A | 1/1986 | Liu et al. |
| 4,596,670 A | 6/1986 | Liu |
| 4,610,808 A | 9/1986 | Kleiner |
| 4,788,104 A | 11/1988 | Adriaensen et al. |
| 6,150,446 A | 11/2000 | Numata |
| 6,156,427 A | 12/2000 | Gotoh et al. |
| 6,399,737 B1 | 6/2002 | Elkovitch |

FOREIGN PATENT DOCUMENTS

| EP | 0 117 700 | 9/1984 |
| JP | 60088064 | 5/1985 |
| JP | 61209120 | 9/1986 |
| JP | 63090564 | 4/1988 |
| JP | 63092672 | 4/1988 |
| JP | 63280603 | 11/1988 |
| JP | 63297459 | 12/1988 |
| JP | 62101654 | 8/1992 |
| WO | WO 02/02686 | 1/2002 |

OTHER PUBLICATIONS

Chemical Abstracts, 109:74631, "Electrically conductive thermoplastic compositions", JP 63 092672 (Apr. 23, 1998).

"Electromagnetic wave shielding resin composition with good impact resistance", Derwent Publications, 1994–054015, XP–002234547.

*Primary Examiner*—Mark Kopec

(57) ABSTRACT

Disclosed is an electrically conductive thermoplastic polymer composition comprising a thermoplastic polymer and a synergistic combination of metal fibers and metal-coated fibers, structures made therefrom, and a process to make said compositions and structures.

19 Claims, No Drawings

ELECTRICALLY CONDUCTIVE THERMOPLASTIC POLYMER COMPOSITION

CROSS REFERENCE STATEMENT

This application claims the benefit of U.S. Provisional Application No. 60/333,187, filed Nov. 13, 2001.

This invention relates to an electrically conductive thermoplastic polymer composition and a structure prepared therefrom and a process for preparing the same.

BACKGROUND OF THE INVENTION

Electronic equipment, particularly sensitive electronic equipment such as computers and communications equipment are all susceptible to malfunction as a result of electromagnetic wave interference. In addition to being sensitive to foreign electromagnetic wave interference, many of these devices generate electromagnetic wave interference. Various methods have been used to impart electromagnetic wave interference shielding to electronic equipment enclosures. Typically, shielding of electronic equipment enclosures is achieved by one or more of three major techniques, i.e., utilizing metal enclosures which, are inherently conductive; utilizing plastic molded enclosures having an electroconductive surface, for example, provided by a conductive film, plating or conductive paint; and molding a conductive plastic enclosure from a polymer containing electroconductive materials.

Attempts have been made to prepare conductive plastics by incorporating certain conductive fillers into engineering thermoplastics. Specifically, these fillers include conductive powders, flakes and fibers. More recently, attempts have been made to find synergistic combinations of conductive fillers so as to provide extrudeable and/or moldable compounds having consistent shielding at lower loadings which maintain properties in the finished molded article. Such combinations include metal fibers and carbon fibers, metal flake and/or carbon fibers in combination with carbon black powder, metal flake and metal or metal-coated fiber, and metal flake and/or metal and/or metal-coated fiber with conductive carbon powder.

Although these combinations have high overall electromagnetic wave interference shielding effectiveness, they suffer from such problems as deteriorating the physical and aesthetic properties of the polymer. Further, the levels of conductive filler required to meet electromagnetic wave interference shielding effectiveness often result in a polymer with such high viscosity it can not practically be molded into electronic equipment enclosures, especially some of the recent thin wall enclosures, such as those found in hand held phones or computers. Another serious problem is the breakage of electroconductive fibers due to shearing and kneading of a polymer and electroconductive fibers to prepare pellets for molding and resulting in lowering the shielding effectiveness in proportion to the degree of breakage. Thus, it is necessary to increase the amount of the electroconductive fibers in the polymer in anticipation of the breakage of the electroconductive fibers, but this will bring about such secondary problems as lowering of the productivity and an increase on the weight of the molded article.

SUMMARY OF THE INVENTION

Accordingly, an object of the present invention is to provide a conductive thermoplastic polymer composition with a good balance of electroconductivity, processability, mechanical and aesthetic properties, while reducing the total amount of metallic filler needed to achieve the desired shielding effectiveness.

To achieve the above object according to the present invention, a conductive thermoplastic polymer composition is provided, which comprises a synergistic combination of a metal fiber and a metal-coated fiber.

Another object of the present invention relates to a process for producing an electrically conductive thermoplastic structure by providing a thermoplastic polymer and a synergistic combination of a metal fiber and a metal-coated fiber to a melt blending apparatus, preferably an injection molding machine or an extruder, then forming an electrically conductive thermoplastic structure, preferably an injection molded article or an extruded sheet.

In the present invention, molded articles having a distinguished electromagnetic wave interference shield function can be produced by injection molding, thermoforming, vacuum-pressure forming, compression molding, etc. Preferably the article is an injection molded article, for example, an electronic equipment housing or an electronic part container for electrostatic charging shield or an article formed from an extruded sheet, for example, a wall for electromagnetic wave interference shield or a protective plate for electronic black boards and display boards.

DETAILED DESCRIPTION OF THE INVENTION

The conductive thermoplastic polymer composition of the present invention is produced from a synergistic combination of one or more metal fiber and one or more metal-coated fibers. The metal fibers and metal-coated fibers useful in the present composition are well known and widely available.

Generally, the metal fibers may be made of aluminum, zinc, copper, silver, nickel, iron, gold, chrome and the like, and alloys thereof such as brass and steel. The preferred metal fiber is stainless steel.

Suitable metal fibers may be essentially any length and diameter which is practical from both a composition and processing standpoint, as known in the art. For example, aluminum fibers measuring 10 millimeters (mm) in length by 90 micrometers diameter are useful and practical whereas stainless steel fibers of similar dimensions may be impractical and cause unnecessary wear on the melt processing equipment: instead stainless steel fiber of 6 mm length by 4 micrometers diameter may be more suitable. Generally, all suitable fibers will have a length equal to or less than of 20 mm, preferably equal to or less than 15 mm, more preferably equal to or less than 10 mm and most preferably equal to or less than 7 mm. Generally, all suitable fibers will have a length equal to or greater than of 0.5 mm, preferably equal to or greater than 1 mm, more preferably equal to or greater than 2 mm and most preferably equal to or greater than 4 mm.

Preferably, iron-base metal fibers, such as stainless steel fibers, have a diameter of about 2 to about 20 micrometers. Other metal-based fibers, for example those of aluminum, zinc, copper, silver, nickel, gold, chrome and the like, preferably have a diameter of about 15 to about 60 micrometers.

The metal fibers preferably have an aspect ratio (the value obtained by dividing the fiber length by the fiber diameter) is from about 200 to about 1000, preferably from about 200 to about 750.

Preferably, the metal fiber is present in an amount equal to or greater than about 2 weight percent, preferably equal to or greater than about 3 weight percent, and more preferably equal to or greater than about 5 weight percent based on the weight of the conductive thermoplastic polymer composition. Preferably, the metal fiber is present in an amount equal to or less than about 15 weight percent, preferably equal to or less than about 13 weight percent, and more preferably equal to or less than about 12 weight percent based on the weight of the conductive thermoplastic polymer composition.

Similarly, the fibers of the metal-coated fibers are generally non-metal fibers such as carbon, glass or a polymer (such as acrylic, poly(p-phenylene terephthalamide), e.g., KEVLAR™, polybenzoxazole and the like) core with a coating of silver, nickel, aluminum, chrome, tin, lead, copper and the like, and alloys thereof such as brass and solder. The preferred metal-coated fiber is nickel-coated carbon.

Suitable metal-coated fibers may be essentially any length and diameter which is practical from both a composition and processing standpoint, as known in the art. Generally, all suitable metal-coated fibers will have a length equal to or less than of 20 mm, preferably equal to or less than 15 mm, more preferably equal to or less than 10 mm and most preferably equal to or less than 7 mm. Generally, all suitable metal-coated fibers will have a length equal to or greater than of 0.1 mm, preferably equal to or greater than 1 mm, more preferably equal to or greater than 2 mm and most preferably equal to or greater than 4 mm.

The fibers of the metal-coated fibers preferably have a diameter of about 5 to about 100 micrometers.

The thickness of metal coating on the fiber is equal to or less than about 2 micrometers, preferably equal to or less than about 1 micrometer and more preferably equal to or less than about 0.5 micrometer. The thickness of metal coating on the fiber is equal to or greater than about 0.1 micrometers and preferably equal to or greater than about 0.25.

The metal-coated fibers preferably have an aspect ratio is from about 200 to about 1000, preferably from about 200 to about 750.

Preferably, the metal-coated fiber is present in an amount equal to or greater than about 2 weight percent, preferably equal to or greater than about 5 weight percent, and more preferably equal to or greater than about 10 weight percent based on the weight of the conductive thermoplastic polymer composition. Preferably, the metal-coated fiber is present in an amount equal to or less than about 25 weight percent, preferably equal to or less than about 20 weight percent, and more preferably equal to or less than about 16 weight percent based on the weight of the conductive thermoplastic polymer composition.

Unless otherwise noted, preferable fiber lengths and aspect ratios hereinabove are for fibers prior to melt blending.

Sources of these fibers include Bekaert Fibre of Marrietta, Ga.; INCO Special Products of Wykoff, N.J.; and Toho Carbon Fibers of Menlo Park, Calif.

The aforementioned synergistic combination of metal fiber and metal-coated fiber is useful in most any thermoplastic polymer or polymer blend. Suitable thermoplastic polymers are well known and include polyethylenes, polypropylenes, ethylene and styrene interpolymers, polyvinylchloride, polystyrenes, impact polystyrenes, styrene and acrylonitrile copolymers, acrylonitrile, butadiene and styrene terpolymers, polyesters, polycarbonates, copolyesterpolycarbonates, polyamides, polyarylamides, thermoplastic polyurethanes, epoxies, polyacrylates, polyarylate ether sulfones or ketones, polyphenylene ethers, polyamide-imides, polyether-imides, or blends thereof.

The electrically conductive thermoplastic compositions of the present invention may further comprise additives typically found in such compositions, for example, flame retardants, coloring agents, plasticizers, UV stabilizers, lubricants, heat stabilizers, anti static agents, and other types of additives as long as those do not hinder the characteristics of the compositions.

Preparation of the electrically conductive polymer composition of the present invention can be accomplished by any suitable mixing means known in the art, for example dry blending the thermoplastic polymer, metal fiber and metal-coated fiber and subsequently melt mixing, either directly in the melt blending apparatus, e.g., an injection molding machine or an extruder, to make the electrically conductive thermoplastic structure of the present invention (e.g., an injection molded article or an extruded sheet or profile), or pre-mixing in a separate extruder (e.g., a Banbury mixer) to produce pellets. Said pellets can then be injection molded or extruded into sheet or profile to produce the electrically conductive thermoplastic structure of the present invention.

Preferably, dry blends of the compositions are directly injection molded or directly extruded into sheet or profile without pre-melt mixing and melt blending to form pellets. The thermoplastic polymer, metal fiber and metal-coated fiber may be introduced into the melt blending apparatus simultaneously in the same location (e.g., feed hopper), individually in different locations (e.g., feed hopper and one or more side feed locations), or in any combination. This process allows for the flexibility of increasing or decreasing the amount of metal fiber and/or increasing or decreasing the amount of metal-coated fiber and/or changing the thermoplastic polymer of the conductive thermoplastic polymer composition online. That is, different balance of electromagnetic wave shielding effectiveness and other properties can be tailored and produced for a specific electrically conductive thermoplastic structure with little effort and minimal inventory of polymers and fibers versus using pre-mixed electrically conductive thermoplastic polymer compositions in the form of pellets.

Preferably, metal and metal-coated fibers tows, sometimes referred to as fiber bundles, are used. Fiber tows are multiple fiber strands bundled together and coated, or impregnated, with a thin polymer layer. The polymer used for coating the bundle may be the same or different from the thermoplastic polymer of the electrically conductive thermoplastic composition. When using fiber tows, it is necessary to decide the mixing amount of the fiber tows in such a manner that the pure metal fiber and/or metal-coated fiber after accounting for the polymer impregnated and adhered in the bundled fibers should be within the aforementioned ranges.

When the electrically conductive thermoplastic structure of the present invention is a sheet, the sheet can be softened or melted by the application of heat, and formed or molded using conventional techniques such as compression molding, vacuum-pressure forming and thermoforming.

EXAMPLES

To illustrate the practice of this invention, examples of preferred embodiments are set forth below. However, these examples do not in any manner restrict the scope of this invention.

The compositions of Examples 3 to 40 are prepared by dry blending polycarbonate resin pellets, a metal fiber tow and/or a metal-coated fiber tow. The mixtures are dried at 100° C. for at least 12 hours. 3.2 mm thick iso-tensile test specimens are prepared by feeding the dry blended mixtures into a 22 ton Battenfeld reciprocating screw injection molding machine, having a 14:1 length:diameter screw with the following molding conditions: barrel temperature settings of 263/273/282/292° C. (feed section to nozzle); a mold temperature of 40 to 50° C.; and the holding pressure immediately after the cavity is filled is held at 73.8 MPa.

The formulation content of Examples 1 to 40 are given in Table 1 below in parts by weight of the total composition. In Table 1:

"PC-1" is a linear polycarbonate available as CALIBRE™ 200-15 polycarbonate resin from the Dow Chemical Company having a melt flow rate (MFR) of 15 grams per 10 minutes (g/10 min.) as measured according to ASTM D-1238 under conditions of 300° C./1.2 kg, "PC-2" is a linear polycarbonate available as CALIBRE 200-22 polycarbonate resin from the Dow Chemical Company having a melt flow rate (MFR) of 22 grams per 10 minutes (g/10 min.) as measured according to ASTM D-1238 under conditions of 300° C./1.2 kg, "SS-1" is stainless steel fibers available as tows from BEKI-SHIELD™ GR60/C20/6 PC stainless steel fibers from Bekaert Fibre Technologies having average lengths of about 6 mm and average diameters of about 8 micrometers. Then bundle is about 60 weight percent stainless steel and 40 weight percent polycarbonate, "SS-2" is stainless steel fibers available as tows from BEKI-SHIELD GR75/C20/6 PC stainless steel fibers from Bekaert Fibre Technologies having average lengths of about 6 mm and average diameters of about 8 micrometers. Then bundle is about 75 weight percent stainless steel and 25 weight percent polycarbonate, "NiC-1" is bundled nickel-coated carbon fibers available as INCOSHIELD™ PC+Nickel nickel-coated carbon fibers from INCO Special Products having an average nickel coating thickness of about 0.25 micrometers on carbon fibers having an average length of about 6.4 mm and the nickel-coated carbon fibers have an average diameter of about 8 micrometers. The bundle is about 60 weight percent nickel coated carbon fibers and 40 weight percent polycarbonate, "NiC-2" is bundled nickel-coated carbon fibers available as BESFIGHT™ C-5MS chopped nickel coated carbon fibers from Toho Carbon Fibers having an average nickel coating thickness of about 0.25 micrometers on carbon fibers having an average length of about 5 mm and the nickel-coated carbon fibers have an average diameter of about 8 micrometers. The bundle is about 75 weight percent of nickel-coated carbon fibers and about 25 weight percent polymer.

One or more of the following tests are run on Examples 1 to 40 and the results of these tests are shown in Table 1:

"SE" is shielding effectiveness measured according to a stripline field applicator method as described in the "A Comparison Of Material Measurements Using A Standard ASTM Measurement Cell And A Stripline Field Applicator", *Proceedings of the Antenna Measurement Test Association*, B. Wilmhoff, et al., Denver, Colo., October 2001, and "An Improved De-Embedding Technique For The Measurement Of The Complex Constitutive Parameters Of Materials Using A Stripline Field Applicator," *IEEE IM-S Trans.*, Vol. 42, no. 3, pp. 740 to 745, June 1993, the disclosures of which are incorporated herein by reference. Test specimens are prepared from 3.2 mm iso-tensile test specimens machined to a thickness of 2.66 mm, and SE values reflect those in the frequency range of 1 to 2 gigahertz (GHz).

"CP" is cavity pressure is determined by means a mold cavity mounted quartz pressure transducer Sensor type 6157 BA from Kistler Instrument Corporation, Amherst, N.Y., located before the end furthest from the gate of the iso-tensile test specimen. As the viscosity of the polymer composition decreases, the cavity pressure measured for fixed injection conditions and flow path geometry generally increases. Higher cavity pressure generally indicates a more fluid, more easily moldable fiber-filled formulation.

Tensile property testing is done in accordance with ASTM D 638. Iso-tensile test specimens are conditioned at 23° C. and 50 percent relative humidity 24 hours prior to testing. Testing is performed using an INSTRON™ 1125 mechanical tester. Testing is performed at room temperature. The following values are reported:

"Ty" tensile yield is reported in pounds per square inch (psi),

"Tm" tensile modulus is reported in $10^5$ psi,

"E" tensile elongation is reported in percent (%),

"DTUL" deflection temperature under load is determined on a Ceast HDT 300 Vicat machine in accordance with ASTM D 648-82 where test specimens are prepared from iso-tensile test specimens and are unannealed and tested under an applied pressure of 1.82 megapascals (MPa).

"Izod" impact resistance as measured by the Notched Izod test (Izod) is determined according to ASTM D 256-90-B at 23° C. The specimens are notched with a TMI 22-05 notcher to give a 0.254 mm radius notch. A 0.91 kilogram pendulum is used. The values are reported in foot pounds per inch (ft.lb/in).

TABLE 1

| Ex | PC-1 | PC-2 | SS-1 | SS-2 | NiC-1 | NiC-2 | SE, dB | CP, MPa | Ty, psi | Tm, $10^5$ psi | E, % | DTUL, ° F. | Izod, ft-lb/in |
|---|---|---|---|---|---|---|---|---|---|---|---|---|---|
| 1* | balance | | | | | | | 43.6 | 8921 | 3.28 | 112 | 263 | 13.8 |
| 2* | | balance | | | | | | 49.18 | 8764 | 3.35 | 101 | | 13.3 |
| 3* | balance | | 2.3 | | 1 | | | | | | | | |
| 4* | balance | | 4.8 | | 3 | | | 38.3 | 8840 | 3.96 | 23 | 263 | 1.8 |
| 5* | balance | | 7.8 | | 11.5 | | | 29.5 | 8844 | 4.26 | 8 | 272 | 1.7 |
| 6* | balance | | 12 | | 25.5 | | | 24.3 | 9250 | 4.53 | 6 | 271 | 1.5 |
| 7* | balance | | 17.2 | | 45.5 | | | 12 | 8799 | 4.54 | 4 | 282 | 1.5 |
| 8* | | balance | 4.8 | | | | | 43.44 | | | | | |
| 9* | | balance | 7.8 | | | | | 38.95 | | | | | |
| 10* | | balance | 12 | | 29.4 | | | 33.58 | | | | | |
| 11* | | balance | 17.2 | | 36.7 | | | 23.16 | | | | | |
| 12* | balance | | | 4.4 | 2 | | | 41.5 | 9641 | 5.63 | 25 | 282 | 2 |
| 13* | balance | | | 7.5 | 6 | | | 39.9 | 10435 | 7.02 | 7 | 292 | 1.7 |
| 14* | balance | | | 10.6 | 11.5 | | | 38 | 11629 | 8.66 | 2 | 295 | 1.6 |

TABLE 1-continued

| Ex | PC-1 | PC-2 | SS-1 | SS-2 | NiC-1 | NiC-2 | SE, dB | CP, MPa | Ty, psi | Tm, $10^5$ psi | E, % | DTUL, °F | Izod, ft-lb/in |
|---|---|---|---|---|---|---|---|---|---|---|---|---|---|
| 15* | balance | | | | 13.5 | | 19 | 36.7 | 11952 | 9.77 | 2 | 292 | 1.7 |
| 16* | | balance | | | 4.4 | | | 46.2 | | | | | |
| 17* | | balance | | | 7.5 | | | 44.96 | | | | | |
| 18* | | balance | | | 10.6 | | | 43.99 | | | | | |
| 19* | | balance | | | 13.5 | | | 42.4 | | | | | |
| 20* | | balance | | | 18.2 | | | 38.75 | | | | | |
| 21 | balance | | 2.3 | | 2.2 | | 1 | 38.66 | | | | | |
| 22 | balance | | 2.2 | | 4.3 | | 17 | 38.6 | | | | | |
| 23 | balance | | 2.2 | | 6.4 | | 19 | 37.15 | | | | | |
| 24 | balance | | 2.2 | | 8.4 | | 32 | 33.7 | | | | | |
| 25 | balance | | 4.7 | | 2.1 | | 16 | 34.4 | 9069 | 4.62 | 12 | | 1.6 |
| 26 | balance | | 4.7 | | 4.2 | | 21 | 34.8 | 9453 | 5.14 | 7 | | 1.5 |
| 27 | balance | | 4.6 | | 6.3 | | 30 | 31.33 | 10186 | 6.17 | 4 | | 1.3 |
| 28 | | balance | 2.1 | | | 13.6 | 45.6 | 40.19 | | | | | |
| 29 | | balance | 4.5 | | | 12.6 | 57.4 | 37.29 | | | | | |
| 30 | | balance | 6 | | | 8.1 | 45 | 37.37 | | | | | |
| 31 | | balance | 6 | | | 10.1 | 58.2 | 35.94 | | | | | |
| 32 | | balance | 5.9 | | | 12 | 56.9 | 35.45 | | | | | |
| 33 | | balance | | 8.6 | | 11.7 | 67.6 | 33 | | | | | |
| 34 | | balance | | 8.6 | | 13.5 | 62.6 | 31.3 | | | | | |
| 35 | | balance | 8.5 | | | 15.2 | 68.2 | 30.7 | | | | | |
| 36 | | balance | 11.3 | | | 11.4 | 53.58 | 25.85 | | | | | |
| 37 | | balance | 11.1 | | | 13.2 | 53.85 | 25.1 | | | | | |
| 38 | | balance | 11 | | | 14.9 | 72.4 | 19.46 | | | | | |
| 39 | | balance | 8.6 | | | 11.7 | | | 12546 | 9.63 | 2 | | 1.2 |
| 40 | | balance | 8.6 | | | 13.5 | | | 11683 | 10.38 | 1 | | 1.1 |

*not an example of the present invention

What is claimed is:

1. A process to produce an electrically conductive thermoplastic structure comprising the steps of:
   (i) providing a thermoplastic resin and a synergistic combination of a metal fiber and a metal-coated fiber to a melt blending apparatus and
   (ii) forming an electrically conductive thermoplastic structure.

2. The process of claim 1 wherein the thermoplastic resin is a polyethylene, polypropylene, ethylene and styrene interpolymers, polyvinylchloride, polystyrene, impact polystyrene, styrene and acrylonitrile copolymers, acrylonitrile, butadiene and styrene terpolymer, polyester, polycarbonate, copolyesterpolycarbonate, polyamide, thermoplastic polyurethane, epoxy, polyacrylate, polyarylate ether sulfone, polyarylate ether ketone, polyphenylene ether, polyamide-imide, polyether-imide, or blends thereof.

3. The process of claim 1 wherein the thermoplastic resin is a polycarbonate, an acrylonitrile, butadiene and styrene terpolymer, or mixtures thereof.

4. The process of claim 1 wherein the metal fiber is aluminum, zinc, copper, silver, nickel, stainless steel, gold, chrome, and alloys thereof.

5. The process of claim 1 wherein the metal fiber is stainless steel.

6. The process at claim 1 wherein the metal-coated fiber comprises a metal coating on a non-metal fiber.

7. The process of claim 6 wherein the thickness of the metal coating is from about 0.1 micrometer to about 2 micrometers.

8. The process of claim 6 wherein the metal coating is silver, nickel, aluminum, chrome, tin, lead, copper, and alloys thereof.

9. The process of claim 6 wherein the non-conductive fiber is carbon, glass or a polymer.

10. The process of claim 1 wherein the metal-coated fiber is nickel-coated carbon.

11. The process of claim 1 wherein the melt blending apparatus is an extruder or an injection molding machine.

12. The process of claim 1 wherein the metal fiber is provided in amount from about 2 weight percent to about 15 weight percent based on the volume of the electrical conductive thermoplastic.

13. The process of claim 1 wherein the metal-coated fiber is provided in amount from about 3 weight percent to about 25 weight percent.

14. An electrically conductive thermoplastic structure produced by the process of claim 1.

15. The process as taught in claim 1 wherein the melt blending apparatus is an extruder further comprising, between the steps of (i) and (ii), the steps of:
   (a) extruding the melt blended thermoplastic resin, metal fibers and metal coated fibers into a sheet and
   (b) thermoforming, vacuum forming or compression molding the sheet.

16. The process as taught in claim 15 wherein the sheet is thermoformed.

17. The process as taught in claim 15 wherein the sheet is compression molded.

18. The process as taught in claim 15 wherein the sheet is vacuum formed.

19. The process as taught in claim 1 wherein the melt blending apparatus is an injection molding machine further comprising, between the steps of (i) and (ii), the step of:
   (c) injecting the melt blended thermoplastic resin, metal fibers and metal coated fibers into an injection mold.

* * * * *

UNITED STATES PATENT AND TRADEMARK OFFICE
CERTIFICATE OF CORRECTION

PATENT NO. : 6,936,191 B2
DATED : August 30, 2005
INVENTOR(S) : Richard T. Fox et al.

It is certified that error appears in the above-identified patent and that said Letters Patent is hereby corrected as shown below:

<u>Title page,</u>
Item [75], Inventor, should read -- Russell B. Peters, Jr. --.
Item [73], Assignee, should read -- Dow Global Technologies Inc. --.

Signed and Sealed this

Twenty-fifth Day of April, 2006

JON W. DUDAS
*Director of the United States Patent and Trademark Office*